(12) United States Patent
Reioux

(10) Patent No.: US 11,472,455 B2
(45) Date of Patent: Oct. 18, 2022

(54) SYSTEM AND METHOD FOR NETWORK COMMUNICATION WITHIN A HYPERLOOP BOGIE DURING A CRITICAL PERIOD OF TIME

(71) Applicant: Hyperloop Technologies, Inc., Los Angeles, CA (US)

(72) Inventor: Paul Reioux, Los Angeles, CA (US)

(73) Assignee: Hyperloop Technologies, Inc., Los Angeles, CA (US)

( * ) Notice: Subject to any disclaimer, the term of this patent is extended or adjusted under 35 U.S.C. 154(b) by 153 days.

(21) Appl. No.: 17/151,118

(22) Filed: Jan. 16, 2021

(65) Prior Publication Data

US 2021/0276602 A1    Sep. 9, 2021

Related U.S. Application Data

(60) Provisional application No. 62/985,088, filed on Mar. 4, 2020.

(51) Int. Cl.
| | | |
|---|---|---|
| *B61L 27/70* | (2022.01) | |
| *H04L 47/2416* | (2022.01) | |
| *B61L 27/04* | (2006.01) | |
| *H04L 47/2441* | (2022.01) | |
| *H04L 67/1074* | (2022.01) | |

(52) U.S. Cl.
CPC ............... *B61L 27/70* (2022.01); *B61L 27/04* (2013.01); *H04L 47/2416* (2013.01); *H04L 47/2441* (2013.01); *H04L 67/1078* (2013.01)

(58) Field of Classification Search
CPC ...... B61L 27/70; B16L 27/04; H04L 47/2416; H04L 47/2441; H04L 67/1078
See application file for complete search history.

(56) References Cited

U.S. PATENT DOCUMENTS

| | | | |
|---|---|---|---|
| 11,210,150 B1* | 12/2021 | Setty | H04L 41/147 |
| 2018/0316425 A1* | 11/2018 | Katiyar | H04B 10/116 |
| 2019/0327141 A1* | 10/2019 | Ganesan | H04L 41/084 |
| 2021/0157609 A1* | 5/2021 | Goel | G06F 11/3044 |
| 2021/0157701 A1* | 5/2021 | Goel | H05K 7/1487 |

* cited by examiner

*Primary Examiner* — Thanh T Nguyen
(74) *Attorney, Agent, or Firm* — Tasty IP, Limited; Nicholas A. Cole

(57) ABSTRACT

A system and method are disclosed herein and relate to a communication network within a hyperloop bogie, wherein the communication network logically connects a plurality of power electronic units. A first power electronic unit may generate a network packet to be sent to a second power electronic unit. The first and second power electronic units may perform a vote to determine a voting result. The first and second power electronic units may substantially independently perform further action based on the voting result. The first and second power electronic units may determine the voting result prior to the conclusion of a critical timeframe beginning with the transmittal of the network packet and ending with the voting result being stored.

20 Claims, 11 Drawing Sheets

SYSTEM AND METHOD FOR NETWORK COMMUNICATION WITHIN A HYPERLOOP BOGIE DURING A CRITICAL PERIOD OF TIME

CROSS REFERENCE AND PRIORITY TO RELATED APPLICATIONS

This application claims the benefit of priority under 35 USC 119(e) to U.S. Provisional No. 62/985,088 entitled "SYSTEM AND METHOD FOR NETWORK COMMUNICATION WITHIN A HYPERLOOP BOGIE DURING A CRITICAL PERIOD OF TIME," filed on Mar. 4, 2020. The aforementioned application is hereby incorporated by reference in its entirety.

BACKGROUND

Hyperloop is a passenger and cargo transportation system relying on a sealed tube and a bogie attached to a pod. The sealed tube has a substantially lower air pressure than the external environment. As such, the bogie and the attached pod may travel with reduced air resistance, thus increasing energy efficiency as well as performance. Further, the acceleration and the velocity of the bogie may be substantially higher than a comparable bogie operating within a gas environment with a higher pressure. Some hyperloop systems rely on magnetic levitation (sometimes referred to as "maglev"). The advantage of using maglev is a further reduction in friction viz. the resistance between a traditional wheel and a traditional track is eliminated by using a maglev-based bogie. Hyperloop is in the early stages of development and commercialization. However, the projected velocity of the bogie may exceed 700 mph (1,127 kmh) in commercialized implementations.

Given the high acceleration and the high velocity of the bogie, the communications system, within the bogie, may need to operate with both high reliability and high performance. What is needed is a communication system which can reliably operate with sufficiently low latency to meet real-time operating conditions relating to a bogie operating in a lower-pressure environment.

SUMMARY

The disclosed solution provides systems and methods for a plurality of power electronic units to transfer information within a communication network. In one aspect, a first power electronic unit generates a network packet. Such generating may occur during a first time period. The first power electronic unit may transmit the network packet during a second time period. A second power electronic unit may receive the network packet during a third time period. The second power electronic unit may determine a first voting result that is based on data within the network packet where the first voting result may occur during a fourth time period.

The system and method may further define the first time period as being prior to the second period of time, the second period being prior to the third period of time, and the fourth period being prior to a fifth time period. During the fifth period of time a safety margin may be defined. In addition, a critical time period may begin at the start of the second time period and terminate at the end of the fifth time period.

The system and method may further perform a first action based on a voting result at the second power electronic unit. The first action may be performed during a sixth time period occurring after the fifth time period. The first power electronic unit may log an event that may be based on the network packet, the first voting result, the first action, or combination thereof. Such logging event may be stored in a memory. The first power electronic unit may determine a second voting result that may be based on data within the network packet. The second voting result may occur during the fourth time period. In one aspect, the first and second voting results may be substantially similar.

The system and method may be based on a bus network operating as the communication network. Further, the bus network may connect the first power electronic unit to the second power electronic unit. The second power electronic unit may transmit the network packet via the bus network to the first power electronic unit during the second time period. During the second period, the first power electronic unit may receive the transmitted network packet via the bus network. The system and method may be embodied in hardware, software, or combination thereof. Further, the software may be stored in a computer-readable medium as instructions which may cause a computer to perform operations based on instructions.

BRIEF DESCRIPTION OF THE DRAWINGS

The accompanying drawings, which are incorporated herein and constitute part of this specification, illustrate exemplary aspects of the claims, and together with the general description given above and the detailed description given below, serve to explain the features of the claims.

DETAILED DESCRIPTION

Figure 1A:
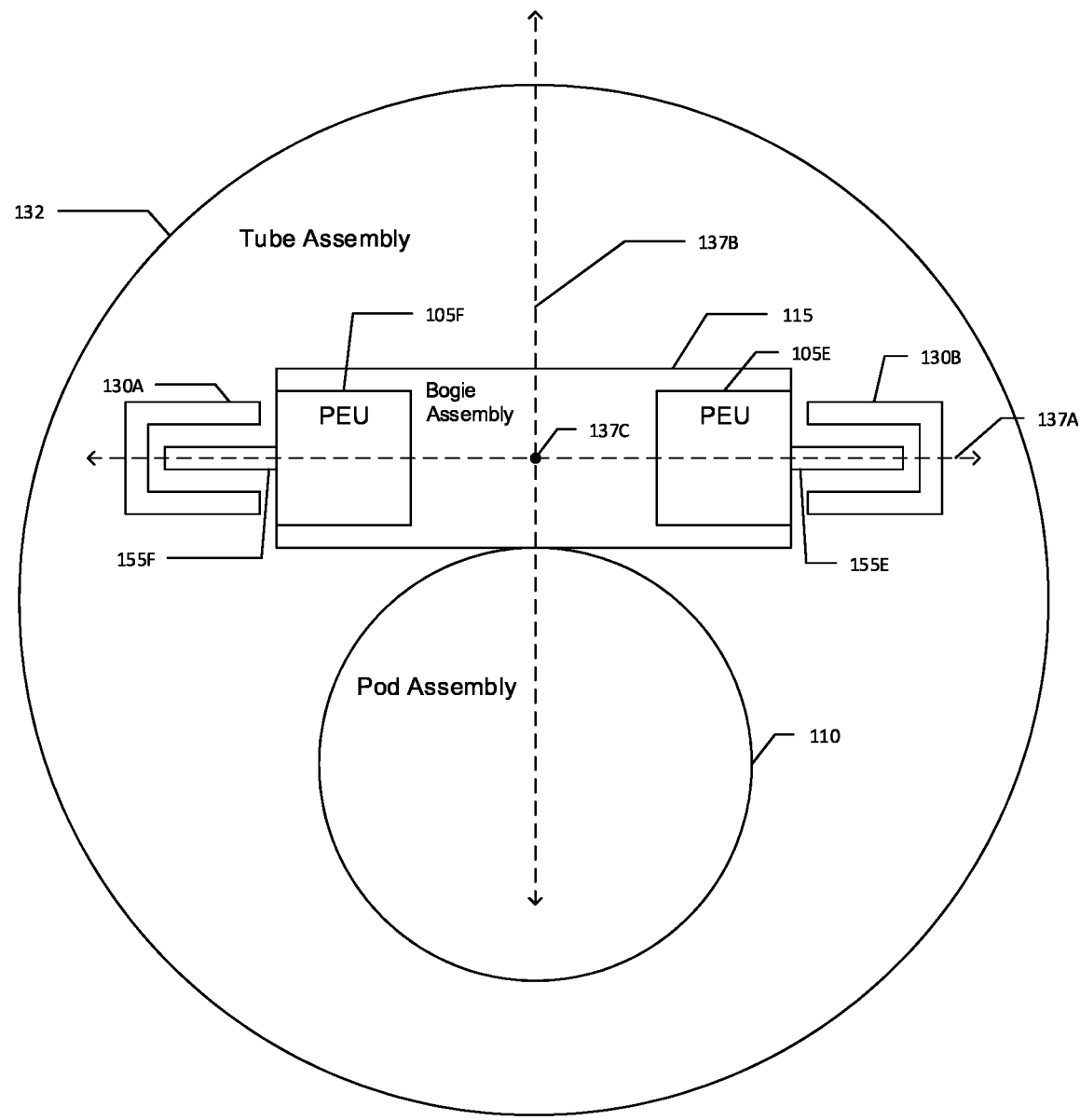
FIG. 1A is planar view of a pod assembly and a bogie assembly, shown from a front perspective.

Various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Hyperloop operates at extremely high speeds given it is a predominately ground-based mode of transportation. In certain operating environments, the velocity of a hyperloop bogie can exceed 700 mph (1,127 kph). A hyperloop system moves passengers and cargo by using a pod attached to the bogie; the bogie and pod operate within a sealed tube. The bogie provides the pod with propulsion, braking, guidance, and other functionality generally related to locomotion. The bogie may further contain other systems relating to communication, both external and internal to the pod.

In traditional aerospace applications with similar velocities, the propulsion and guidance systems are generally separated. For instance, an aircraft may have an engine subsystem that is not in substantially real-time communication with the ailerons, flaps, rudder, etc. If the engine subsystem provides too much or too little power, the guidance system can still function because the aircraft can rely on glide to continue the aircraft's smooth operation. As such, near-instant communication between propulsion and guidance is not required to achieve: high performance, low energy consumption and safe operation of the aircraft. However, in a hyperloop system, the propulsion and guidance systems are substantially combined within the bogie.

The hyperloop system relies a "long stator" approach, which is a straightened-out version of a conventional rotary electric motor. In a conventional rotary electric motor, voltage is applied to the stator, and the rotor performs work. With a linear electric motor, the rotor does not rotate but instead moves along the length the stator which is affixed to the interior of a sealed tube. Thus, the bogie straddles the stators while traveling through the tube. A bogie may have dozens of linear electric motors, all of which may be in constant communication with each other to coordinate the smooth acceleration and deceleration of the bogie (and the attached pod).

One particularly difficult problem for maglev-based hyperloop systems is maintaining the correct air gap between the bogie and the levitation rail. A hyperloop system may employ the use of an electromagnetic suspension ("EMS") or an electrodynamic suspension ("EDS"). In such suspension systems, the bogie is not in physical contact with the track i.e. the bogie levitates above (or below) the track. However, such levitation requires constant monitoring and adjustment in real-time because electromagnetic forces are inherently unstable in many operating environments. Failure to properly adjust the electromagnetic forces may result in low performance, high energy consumption, and dangerous operation of the bogie (and the attached pod).

With several engines in operation at once, the various engines may compete with one another to adjust guidance. However, such competition may result in wasted energy. For example, a first engine may move in one direction, and a second engine may consider such movement to require correction. However, the first engine may consider the second engine's response to require further correction. Then, the second engine may further correct the latest correction by the first engine. One of skill in the art can readily appreciate that such competition among the engines may result in not only undesired energy consumption but also result in a dangerous situation for the bogie, potentially resulting in damage to property or a loss of life.

Given the high velocity of a bogie, a slight error or failure of a system within the bogie (e.g., braking failure) may result in a dangerous situation. To mitigate such a situation, the various systems within the bogie may require fast, reliable communication among the various systems. For example, emergency braking systems may need to communicate with sensors within the pod to determine a braking force necessary to prevent the bogie (and the attached pod) from colliding with an object. Catastrophic failure may lead to loss of life. The high velocity reduces the response time to such a level that existing solutions cannot provide adequate communication among the systems with the bogie.

The methods and systems proposed herein provides high-performance, low-latency communication among the systems within the bogie. With such communication, the bogie can increase performance, decrease energy consumption, and meet necessary safety requirements. The systems described above (e.g., braking) are one of many systems within the bogie enabling stable operation of the bogie. For instance, life-support systems may likewise demand the same (or higher) level of communication as the propulsion system.

FIG. 1A is planar view of a pod assembly 110 and a bogie assembly 115, shown from a front perspective. In one aspect, the pod assembly 110 may be generally configured to carry passengers. In another aspect, the pod assembly 110 may be generally configured to carry cargo. The pod assembly 110 is depicted as cylindrical, but one of skill in the art will appreciate the design of the pod assembly 110 may be any shape operable to fit inside a low-pressure tube.

The pod assembly 110 may be connected to the bogie assembly 155 which is generally configured to provide locomotion to the pod assembly 110 via a tube assembly 132. The bogie assembly 115 may contain any number of electronic and mechanical systems. As shown, the bogie assembly 115 may contain a first power electronic unit ("PEU") 105F and a second PEU 105E. The PEUs 105E, 105F are at least configured to provide propulsion and guidance to the bogie assembly 115 using a battery system, a linear electric motor, a plurality of sensors, or combination thereof.

The tube assembly 132 may have a first levitation rail 130A and a second levitation rail 130B. In one aspect, the tube assembly 132 may contain an environment substantially consisting of air. Further, the air may be at pressure lower than one atmosphere. In one aspect, the environment may substantially be a vacuum. The levitation rails 130A, 130B may be comprised of steel. Further, the bogie assembly 115 may substantially levitate with respect to the levitation rails 130A, 130B.

The levitation may be achieved by interposing a fin assembly 115F inside the levitation rail 130A and the fin 155E inside the levitation rail 130A. The fin 115F may be part of the PEU 105F. Likewise, the fin assembly 115E may be part of the PEU 105E. In one aspect, the fin assemblies 115E, 115F may be part of a linear electric motor assembly within the PEUs 105E, 105F. The levitation rails 130A, 130B and the fin assemblies 155E, 155F may have attractive or repulsive magnetic forces between the levitation rails 130A, 130B and the fins assemblies 155E, 155F, respectively.

The fin assemblies 155E, 155F may freely move in three directions. As shown, the bogie assembly 115 may rotate vertically about a first axis 137A. Further, the bogie assembly 115 may rotate horizontally about a second axis 137B. Still further, the bogie assembly 115 may rotate clockwise or counterclockwise about a third axis 137C. One of skill in the art will appreciate that the axis 137C is projected toward the viewer. In aeronautical terms, the three axes 137A, 137B, 137C may correspond to the principal axes of an aircraft i.e. roll, pitch, and yaw. One of skill in the art will appreciate the difficulty in maintaining balance among the fin assemblies 155E, 155F. For example, a clockwise rotation about the axis 137C may cause the fin assembly 155F to approach the top of the levitation rail 130A thus causing the fin assembly 155E to approach the bottom of the levitation rail 130B.

Figure 1B:
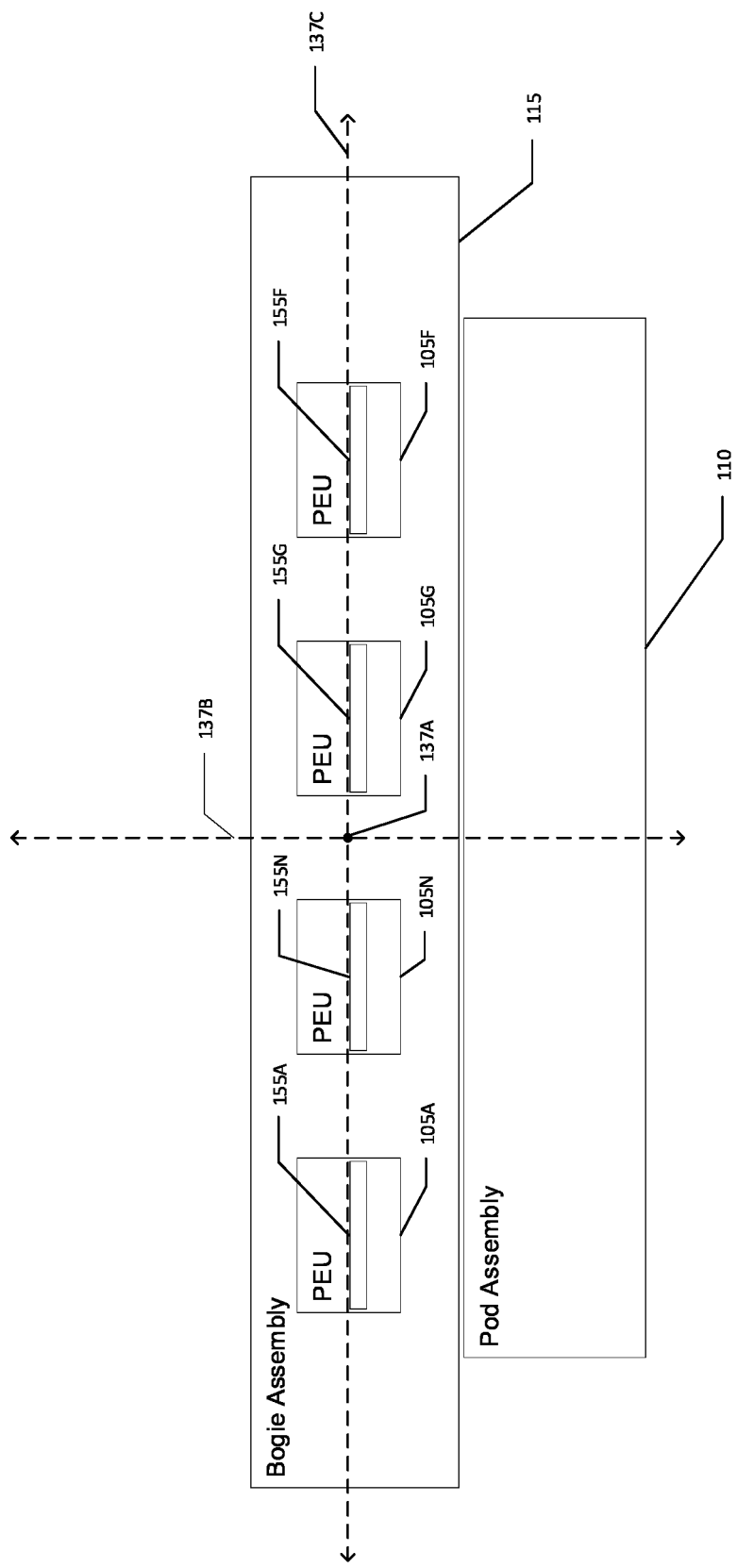
FIG. 1B is a planar view of the pod assembly and the bogie assembly of FIG. 1A, shown from a side perspective.

FIG. 1B is a planar view of the pod assembly 110 and the bogie assembly 115 of FIG. 1A, shown from a side perspective. The levitation rails 130A, 130B are not shown in order to provide better clarity. The bogie assembly 115 may house any number of PEUs as shown in the instant figure. The PEU 105F may be disposed toward the front of the bogie assembly 115. A PEU 105A may be disposed toward the rear of the bogie assembly 115. The PEU 105A may have a fin assembly 155A. Any number of PEUs may be disposed in between the PEUs 105A, 105F. For clarity, another PEU 105N and yet another PEU 105G are depicted. The PEU 105N may have a fin assembly 155N. Likewise, the PEU 105G may have a fin assembly 105G.

As discussed above, the bogie assembly 115 may rotate about the axes 137A, 137B, 137C. Given the high velocity nature of hyperloop locomotion, one of skill in the art will appreciate the difficulty in managing the travel of the fin assemblies 155A, 155F, 155G, 155N moving through the levitation rails 130A, 130B. For example, the fin assembly 155A may be attracted to the levitation rail 130A causing the fin assembly 155F to rise.

The pod assembly 110 and the bogie assembly 115 may contain many other systems and subsystems that are beyond the scope of the instant disclosure. One of skill in the art will appreciate that the pod assembly 110 may contain, for example, climate control systems, autonomous navigation systems, radio communication systems, etc. Likewise, the bogie assembly 115 may contain, for example, pod-to-pod traffic control systems, signaling systems, headlight systems, etc.

Figure 1C:
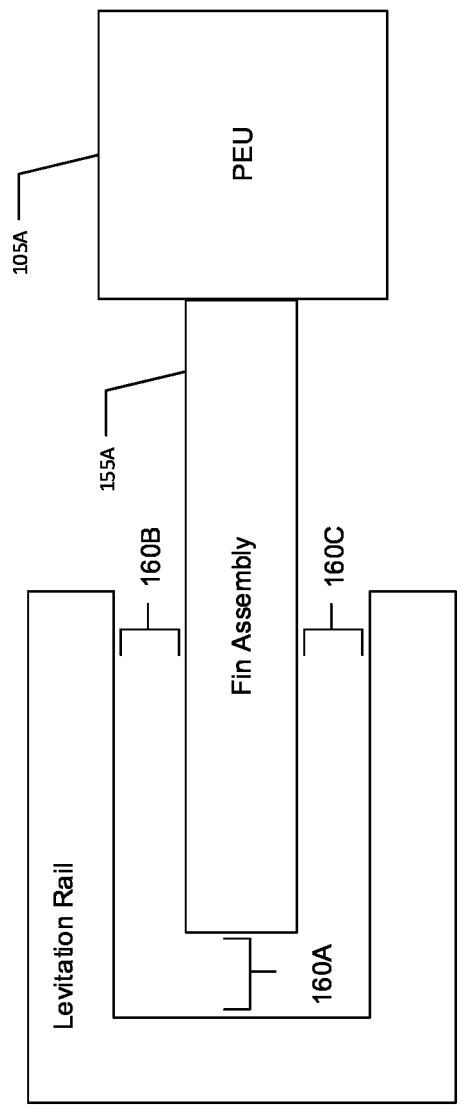
FIG. 1C is a planar view of a levitation rail, shown from a front view.

FIG. 1C is a planar view of the levitation rail 130A and the PEU 105A, shown from a front view. The levitation rail 130A may have a lateral air gap 160A, a dorsal air gap 160B, and a ventral air gap 160C. The air gaps 160A, 160B, 160C are generally present to provide reduced-friction movement of the fin assembly 155A as the bogie assembly 115 travels via magnetic levitation along the levitation rail 130A. The air gaps 160A, 160B, 160C may be as small as 15 mm in order to maintain the attractive and/or repulsive magnetic forces necessary for substantially frictionless locomotion.

Figure 1D:
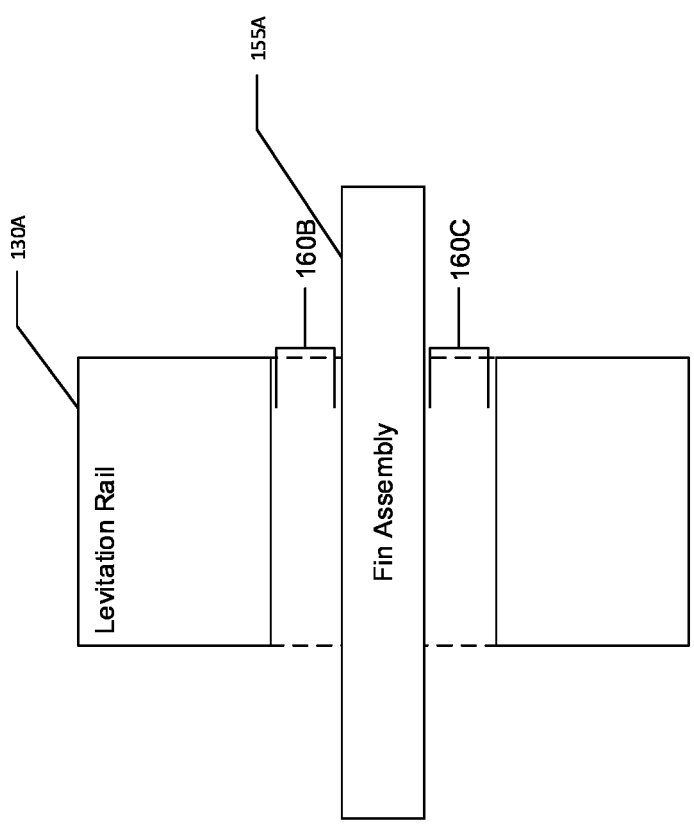
FIG. 1D is a planar view of the levitation rail of FIG. 1C, shown from a side perspective.

FIG. 1D is a planar view of the levitation rail 130A of FIG. 1C, shown from a side perspective. The lateral air gap 160A from FIG. 1C is obstructed in the instant view. Likewise, the PEU 105A is obstructed in the instant view.

One of skill in the art will appreciate the difficultly of maintaining the necessary distance between the levitation rail 130A and the fin assembly 155A while the bogie assembly 115 is traveling at high velocity. Any subtle change to one air gap may affect at least one other air gap. The problem is further complicated by having several fin assemblies, each with their own necessary air gaps, all of which may need to be at or near 15 mm, in one aspect. Therefore, fast and reliable communication among the PEUs 105A, 105F, 105G, 105N is necessary to achieve fast and safe travel of the bogie assembly 115 and the attached pod assembly 110.

Figure 2A:
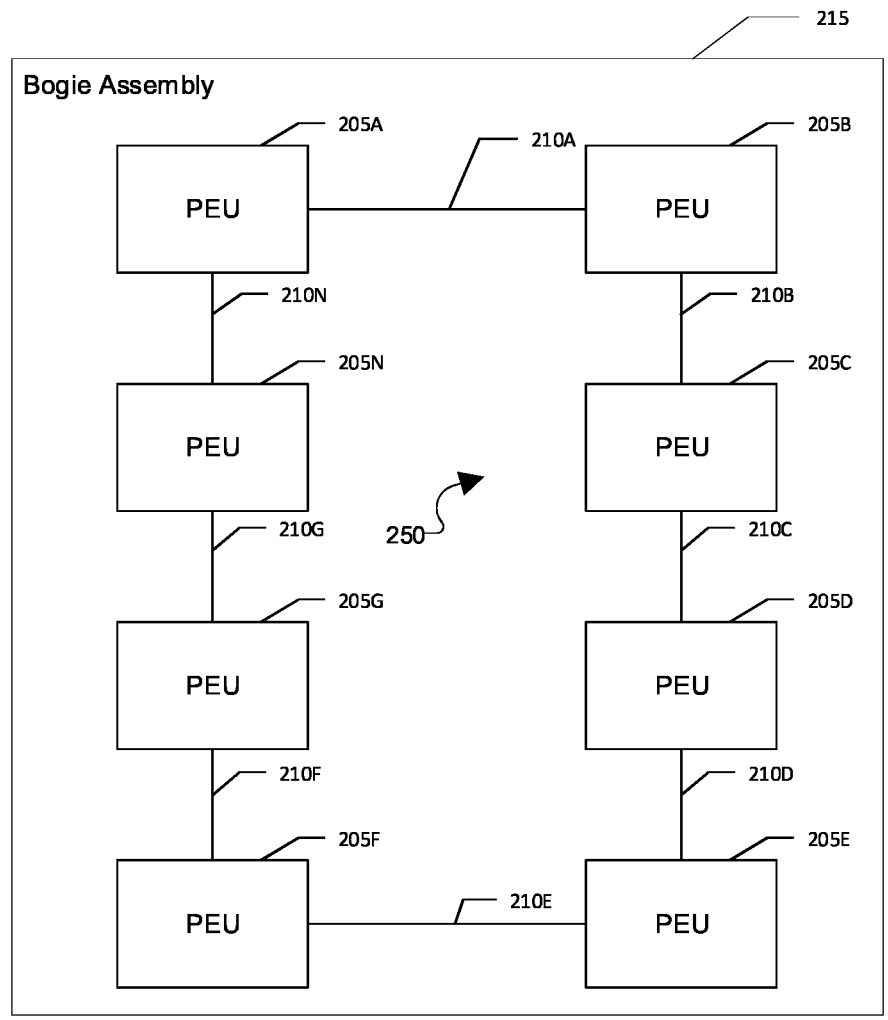
FIG. 2A is a block diagram illustrating a bogie assembly containing a plurality of power electronic units connected via a communication network.

FIG. 2A is a block diagram illustrating a bogie assembly 215 containing a plurality of PEUs connected via a communication network 250. A first PEU 205A may be connected to a second PEU 205B via a link 210A. The PEU 205B may be connected to a PEU 205C via a link 210B. The PEU 205C may be connected to a PEU 205D via a link 210C. The PEU 205D may be connected to a PEU 205E via a link 210D. The PEU 205E may be connected to a PEU 205F via a link 210E. The PEU 205F may be connected to a PEU 205G via a link 210F. The PEU 205G may be connected to a PEU 205N via a link 210G. The PEU 205N may be connected to the PEU 205A via a link 210N. In one aspect, the links 210A, 210B, 210C, 210D, 210E, 210F, 210G, 210N may be wired, wireless, or combination thereof.

The links 210A, 210B, 210C, 210D, 210E, 210F, 210G, 210N may logically and/or physically form a ring network with each of the PEUs 205A, 205B, 205C, 205D, 205E, 205F, 205G, 205N being a node. The ring network is generally defined by each node having two connections. One of skill in the art may substitute the ring configuration for any known network topology (e.g., point-to-point, bus, star, mesh, etc.). One advantage of the ring configuration is a reduction in the physical length of network cable used to connect the nodes. In a network configuration in which substantially all nodes send and receive each packet, a ring configuration may be a more elegant and efficient approach to achieve communication among the nodes.

Figure 2B:
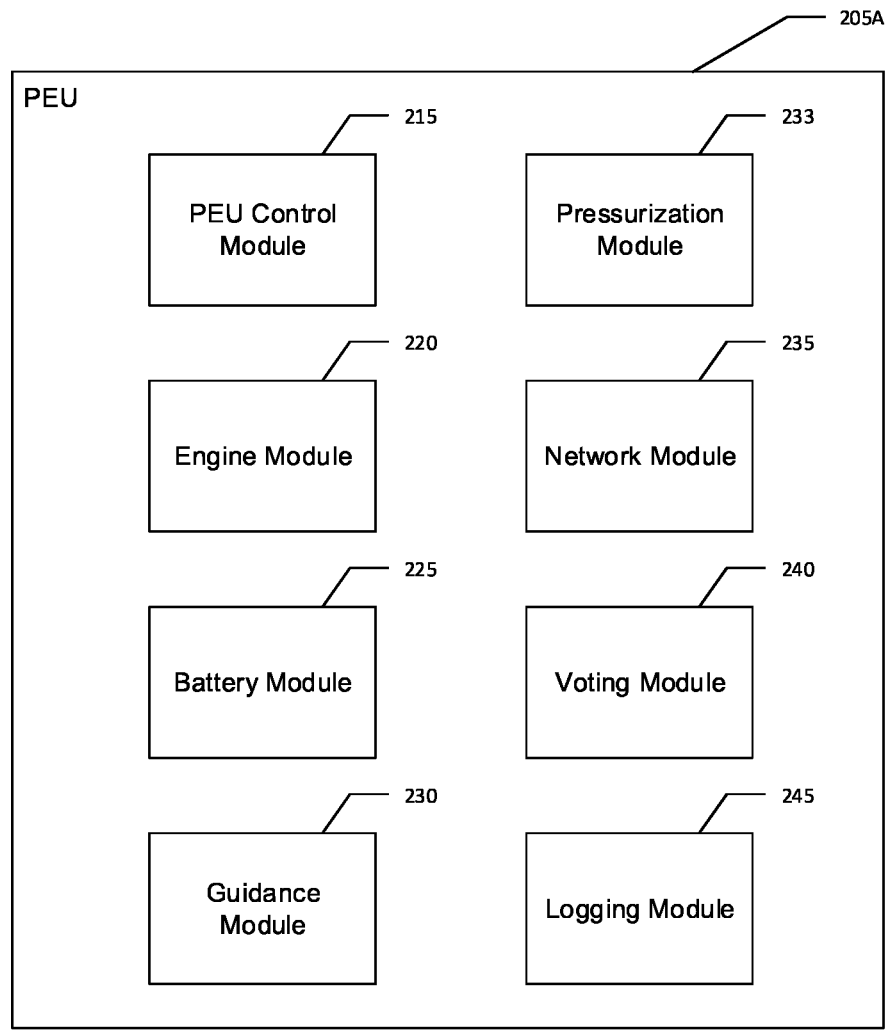
FIG. 2B is a block diagram illustrating a power electronic unit.

FIG. 2B is a block diagram illustrating a PEU 205. The PEU 205 may contain a PEU control module 215, an engine module 220, a battery module 225, a guidance module 230, a pressurization module 233, a network module 235, a voting module 240, and a logging module 245.

The PEU control module 215 is generally configured to manage the operation of the PEU 205. In one aspect, the PEU control module 215 is configured to facilitate and arbitrate communication among the various modules within the PEU 205. In another aspect, the PEU control module 215 may comprise a processor, a memory, or combination thereof. One of skill in the art will appreciate the methods proposed herein may be embodied as software operating within a memory module of the PEU control module 215. Further, a processor may execute instructions and/or executable code from memory to carry out the operations discussed herein.

The engine module 220 is generally configured to facilitate and manage the propulsion generated by the PEU 205. In one aspect, the engine module 220 may comprise a linear electric motor and related subsystems. Referring back to FIG. 1A, the fin assembly 155F may be a hardware component of the engine module 220. The engine module 220 may have sensors to detect electromagnetic force being applied to the levitation rail.

The battery module 225 is generally configured to facilitate and manage energy storage and distribution. In one aspect, the battery module 225 may contain a lithium ion battery and the associated subsystems to manage the storage and distribution of energy. For example, the battery module 225 may provide energy to the engine module 220 in order to power a linear electric motor. The battery module 225 may have sensors to detect the state of charge, current temperature, etc. of the battery hardware.

The guidance module 230 is generally configured to provide guidance of the PEU 205. In one aspect, the guidance module 230 may calculate the magnetic force necessary to maintain the proper air gap between a fin assembly and a levitation rail. The guidance module 230 may have sensors to detect the distance of the air gap (e.g., a Hall sensor).

The pressurization module 233 is generally configured to provide air pressure control for the PEU 205. In one aspect, the PEU 205 may be operated in a low-pressure environment (or even a vacuum). As such, the PEU 205 may require a different pressure than the surrounding environment. For example, the PEU 205 may have thermal-related requirements that demand a higher-pressure environment for cooling and/or heating purposes which may not be achieved in a vacuum. The pressurization module 233 may have a number of air pressure sensors to detect variations in the air pressure of the PEU 205.

The network module 235 is generally configured to manage communication to systems external to the PEU 205, including other PEUs as described herein. The network module 235 may transmit and receive network packets. In one aspect, the network module 235 may communicate via the links 210A, 210B, 210C, 210D, 210E, 210F, 210G, 210N. For example, the network module 235 within the PEU 205A may communicate with the PEU 205B via the link 210A. Further, the PEU 205B may have a network module operable to receive such communication from the PEU 205A.

The voting module 240 is generally configured to enable the PEU 205 to vote on events occurring among the PEUs 205A, 205B, 205C, 205D, 205E, 205F, 205G, 205N. In one aspect, the PEU 205 is an autonomous, decision-making unit, by using internal logic. The voting module 240 may provide consensus among the PEUs 205A, 205B, 205C, 205D, 205E, 205F, 205G, 205N, all of which may be acting substantially autonomously. For example, the PEU 205A may send a message that the engine module 220 is increasing acceleration. Such a message would be both logically sent and logically received by the PEU 205A, assuming a bus network configuration. When the message is received by the PEUs 205A, 205B, 205C, 205D, 205E, 205F, 205G, 205N, each may utilize voting logic in each respective voting module 240 to reach a decision relating to action or inaction. In this example, the PEU 205B may increase acceleration (with assistance from the voting module 240) to match the increasing acceleration of the PEU 205A.

The logging module 245 is generally configured to record and store events within the PEU 205. Each of the PEUs 205A, 205B, 205C, 205D, 205E, 205F, 205G, 205N may operate substantially autonomously but in concert with the other PEUs 205A, 205B, 205C, 205D, 205E, 205F, 205G, 205N. In the event of failure, the logging module 245 may provide details relating to the operating conditions such that technicians can troubleshoot problems, increase performance, monitor computational resources, etc. Given the literally fast-moving operating environment of hyperloop, the logging module 245 may need to log thousands of events per millisecond. Further, the storage size of logged events may be gigabytes in size (e.g., capturing several snapshots of memory). Therefore, the logging module 245 may be logically coupled to a memory.

Figure 3:
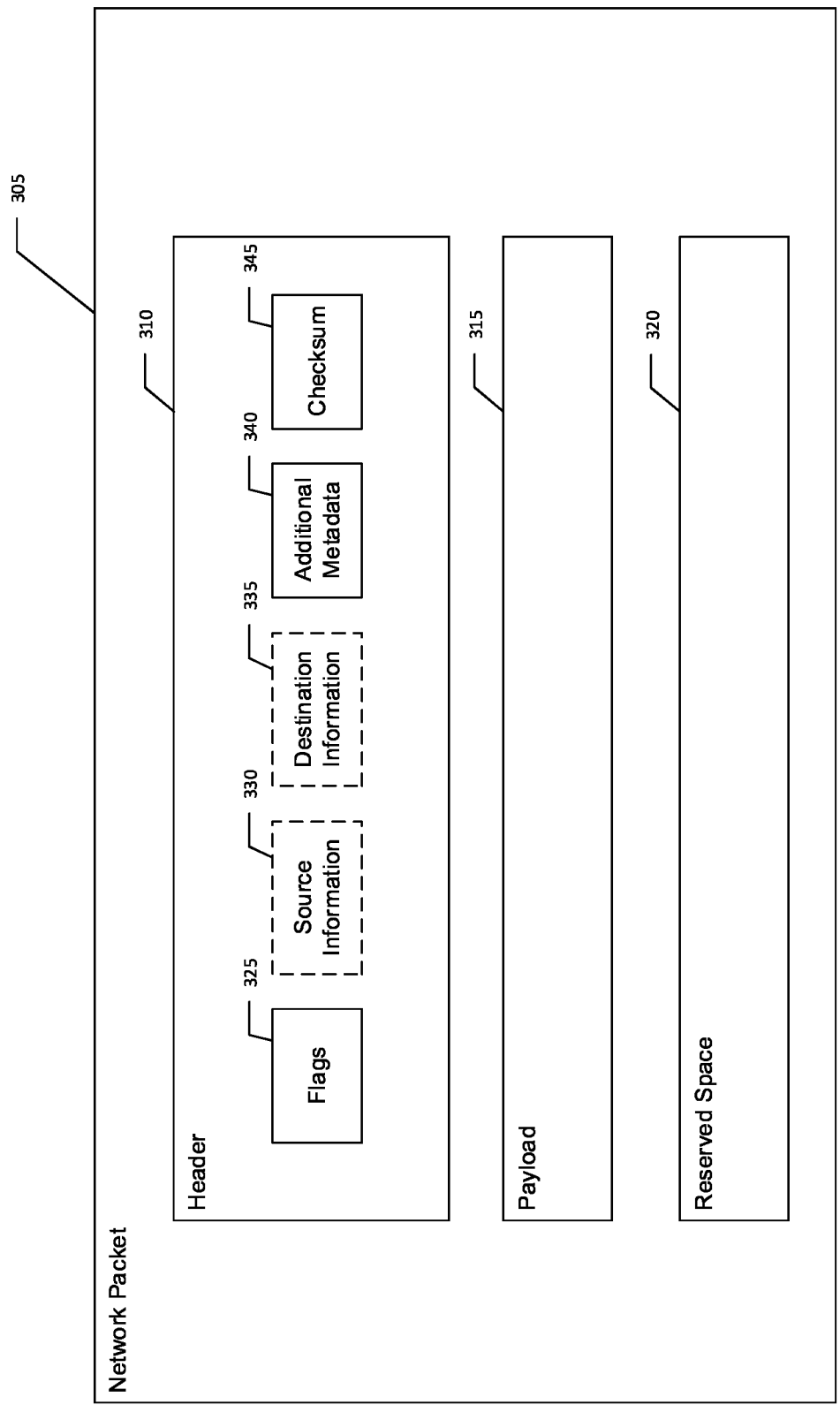
FIG. 3 is a block diagram illustrating a network packet.

FIG. 3 is a block diagram illustrating a network packet 305. The network packet 305 may have a header 310, a payload 315, and a reserved space 320. The header 105 may contain flags 325, source information 330, destination information 335, additional metadata 340, and a checksum 345. The flags 325 may contain information relating to protocol state and/or events. For example, a flag may be an indication that a particular network packet is the last in a series of network packets previously sent.

The source information 330 may contain information relating to the source of the packet. In one aspect, the source information 330 may contain a unique identifier of the PEU which transmitted the network packet 305. The destination information 335 may contain information relating to the network destination of the network packet 305. In one aspect, the destination information 335 may be the unique identifier of a PEU intended to receive the network packet 305. Depending on the nature of the communication network, the source information 330 and the destination information 335 may be omitted as a PEU generating the network packet 305 is assumed to be the source and all PEUs (including the originating PEU) are considered the destinations.

The additional metadata 340 may contain metadata for the payload 315. In one aspect, the additional metadata 340 may be reserved for future use cases. The checksum 345 may be configured to provide a means to verify the integrity of the network packet 305 such that the data contained therein is considered reliable.

The payload 315 may contain the messages, data, and information intended for communication among the PEUs. In one aspect, the payload 315 may relate to events within a PEU. For example, the PEU 105A may indicate in the payload 315 that the ventral air gap 160C has been reduced by 1 mm. The payload 315 may be wrapped within the network packet 305. Any receiving PEUs may then extract the data inside the payload 315 and take action as necessary.

The reserved space 320 may be utilized for future designs of the network packet 305. At a future date, additional information may need to be stored within the network packet 305; however, the need for the additional information may not be known at the time of deployment. Therefore, the reserved space 320 provides a means to augment the data within the network packet 305 without increasing the overall size of the network packet. In one aspect, the reserved area 320 may be "zeroed-out" wherein each memory bit is set to zero until future designs demand otherwise.

Figure 4:
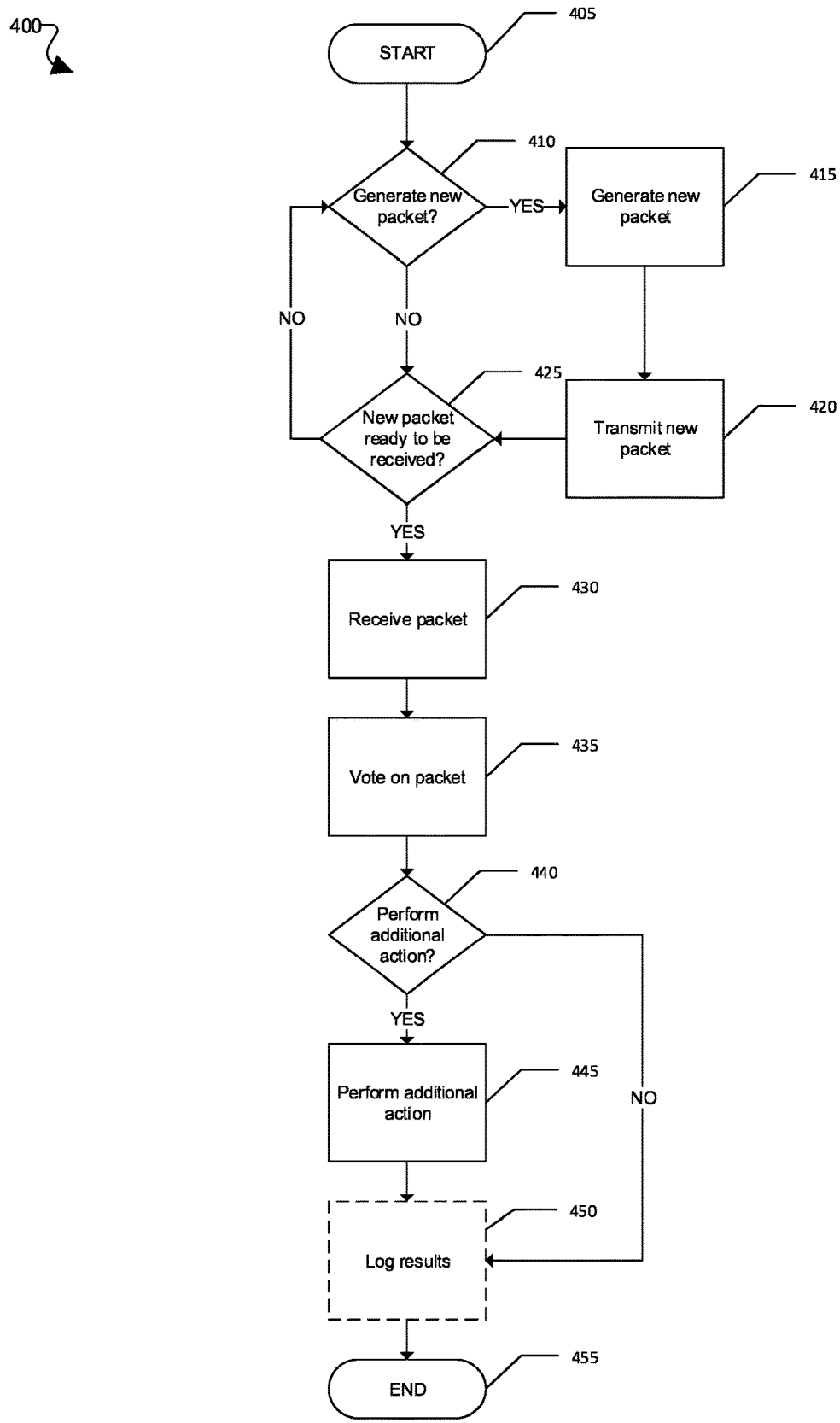
FIG. 4 is a flowchart illustrating a method for power electronic units to transfer information using a communication network.

FIG. 4 is a flowchart illustrating a method 400 for PEUs to transfer information using a communication network. The method 400 begins at the start block 405 and proceeds to the decision block 410. At the decision block 410, the method 400 may determine whether to generate a new network packet. In one aspect, a PEU may generate a network packet. For example, the PEU 205A may determine, using the battery module 230, that the charge of the batteries is approaching a critical level. In another example, the PEU 205A may determine, using the engine module 220, that the acceleration should be decreased. In yet another example, the PEU 205A may determine, using the guidance module 230, that a face of the fin assembly is too far from the surface of the levitation rail (e.g., fin assembly 155A and levitation rail 130A). One of skill in the art will appreciate that several events within the bogie assembly 115 may require the generation of a network packet to communicate an event.

If a determination is made to generate a network packet, the method 400 proceeds along the YES branch to the block 415. At the block 415, the method 400 may generate a new network packet. As described above, an event may cause the method 400 to generate a network packet for communication with the PEUs in the communication network. In one aspect, the network packet may be substantially similar to the network packet 305 described above. For example, the payload 315 may contain with data relating to the current and desired acceleration of a particular PEU. Further, the source information 330 may contain a unique identifier of the PEU transmitting the network packet 305, and the destination information 335 may contain information relating to the desired recipient PEU of the network packet 305. The method 400 then proceeds to the block 420.

At the block 420, the method 400 transmits the network packet via the communications network 250. In one aspect, the communications network 250 is formed by the PEUs 205A, 205B, 205C, 205D, 205E, 205F, 205G, 205N and the respective links 210A, 210B, 210C, 210D, 210E, 210F, 210G, 210N. In another aspect, the network packet is substantially similar to the network packet 305 described above. The network packet 305 may be transmitted not only to the originating PEU but to substantially all PEUs including the originating PEU. Such a broadcast configuration may provide additional reliability within the communication network.

Returning to the decision block 410, the method 400 may determine that a new network packet is not required. The determination that a new network packet is not required may result in a state in which the PEU is waiting and/or ready to receive a network packet from the other PEUs in the communication network. In one aspect, the PEU may simply be sleeping or idle. Given the high throughput nature of the communication network 250 described above, the PEUs 205A, 205B, 205C, 205D, 205E, 205F, 205G, 205N may likely alternate between sending network packets and receiving network packets. One of skill in the art will appreciate that several network packets may be sent every millisecond in a deployed implementation of the solution proposed herein. As described herein, the communication network 250 may be a bus network topology. The method 400 then proceeds to the decision block 425.

At the decision block 425, the method 400 determines whether a new packet is ready to be received. In one aspect, the method 400 may poll the communication network 250 for network packets being transmitted. If the method 400 determines no new packet is ready to be received, the method 400 proceeds along the NO branch to the decision block 410. Turning back to the decision block 425, the method 400 may determine that the PEU is ready to receive a network packet. In one aspect, the method 400 may utilize the network module 235, within the PEU 205A, to indicate that a new network packet 305 may be received. One of skill in the art will appreciate that the PEU 205A may be both a sender and receiver of not only the network packets generated by other PEUs but also by network packets sent by the PEU 205A. The method 400 then proceeds along the YES branch to the block 430.

At the block 430, the method 400 may receive a network packet 430. In one aspect, the PEU 205A may receive the network packet 305 via the networking module 235 in logical connection with the communication network 250. For example, the PEU 205A may receive a network packet 305 from the PEU 205N via the link 210N. In one example, the network packet 305 may contain a payload 315 indicating the PEU 205N is losing air pressure according to sensors managed by the pressurization module 237. The method 400 then proceeds to the block 435.

At the block 435, the method 400 may vote on the information contained within a network packet. In one aspect, the vote may be performed using algorithms and logic within the voting module 240. For example, the network packet 305 may contain data in the payload 315 indicating that the PEU 205A is beginning to approach the levitation rail 130A due to a mechanical issue in the fin assembly 155A. Such a mechanical issue may be dangerous to the passengers within the pod 110. The voting algorithm may need to receive real-world sensor information quickly to prevent a collision from occurring. As such, the network packet 305 may have a timeframe of less than one millisecond in order to provide the voting module 240 enough time to calculate a voting result. The method 400 then proceeds to the decision block 440.

At the decision block 440, the method 400 operates from the vote result determined in the block 435, as described above. The vote result may relate to performing an action or remaining idle. As such, the method 400 may proceed along the NO branch to the block 450 if a determination to perform no action is made. Returning to the decision block 440, if a determination is made (based on the voting result) to perform additional action, the method 400 proceeds along the YES branch to the block 445. For example, a determination to perform additional action may be based on emergency events, performance optimizations, power conservation, etc.

At the block 445, the method 400 performs additional action based on the information contained within the received network packet. One example of performing action may occur when the PEU 205A receives information from the PEU 205B that the bogie assembly 115 is beginning to rotate about the axis 127C which may cause performance loss and/or excessive wear on engine parts. As such, the PEU 205A may engage algorithms within the engine module 220 to reduce power based on information sent from the guidance module 230. In one aspect, the PEU control module 215 assists the communication between the engine module 220 and the guidance module 230. The method 400 then proceeds to the block 450.

At the block 450, the method 400 may log events related to the operations, events, etc. related to the operations described above. For example, the logging module 245 may record flight information sent by the guidance module 230 such that technicians can evaluate performance of guidance sensors embedded within the PEU 205A. The method 400 then proceeds to the end block 455.

Figure 5:
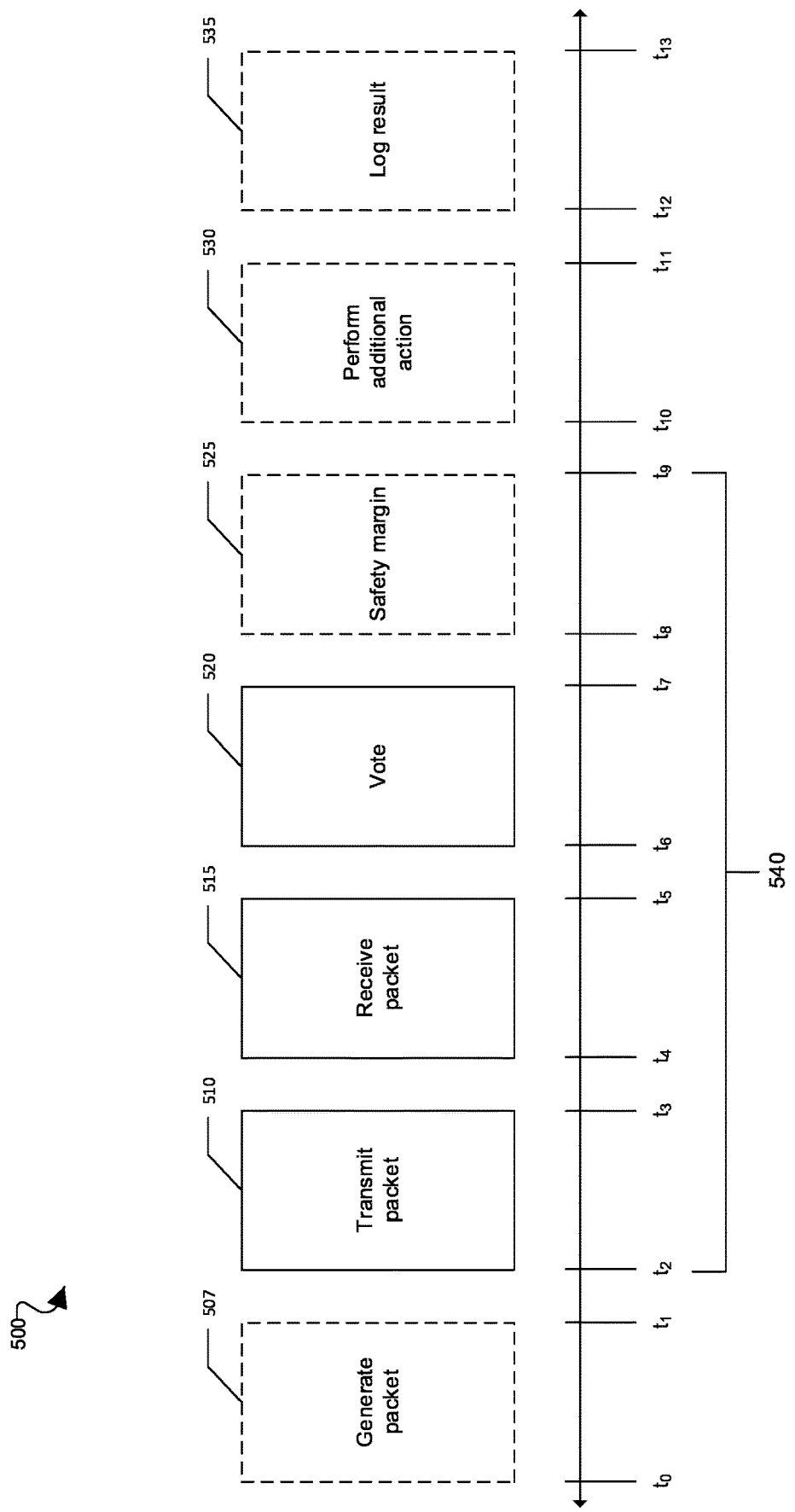
FIG. 5 is a timeline illustrating the timing of events within a communication network.

FIG. 5 is a timeline 500 illustrating the timing of events within a communication network. In one aspect, the method 400 described above may be in execution such that the events depicted in the timeline 500 occur based, in part, on the algorithms of the method 400. The timeline 500 begins at $t_0$ and terminates at $t_{13}$. Beginning at $t_0$, the timeline 500 indicates a new packet may be generated at the block 507. In one aspect, the block 507 may correspond to the blocks 410, 415 of the method 400.

At $t_2$, the block 510 indicates a network packet may be transmitted. In one aspect, the network packet may correspond to the network packet 305. In one aspect, the block 510 may correspond to the blocks 420, 425 of the method 400. A critical timeframe 540 may be defined as the time period between $t_2$ and $t_9$. Therefore, at $t_2$, the critical timeframe 540 may begin.

Between $t_3$ and $t_4$, network latency between transmitting and receiving may occur. For example, 300 μs may be the average latency of the communication network 250 needed to achieve desirable throughput to meet the time budget of the critical timeframe 540.

At the $t_4$, the block 515 indicates a network packet may be received. In one aspect, the network packet may correspond to the network packet 305. In one aspect, the block 515 may correspond to the block 430 of the method 400. Between $t_5$ and $t_6$ network latency may be present, similar to the latency between $t_3$ and $t_4$.

At $t_6$, the block 520 indicates a determination of a voting result, based in part on the information within the network packet. In one aspect, the voting result may be determined within the block 425 of the method 400. Between $t_8$ and $t_9$ a safety margin may exist to ensure the critical timeframe 540 is met in spite of delay within the blocks 510, 515, 520. The critical timeframe 540 ends at $t_9$. One of skill in the art will appreciate that the blocks 510, 515, 520, 525 may occur within the critical timeframe 540 such that the communication network 250, described above, may achieve high-performance, low-latency communication among the PEUs 205A, 205B, 205C, 205D, 205E, 205G, 205N. For example, if the PEU 205A generates a network packet and transmits the network packet, each of the PEUs 205A, 205B, 205C, 205D, 205E, 205G, 205N may receive the network packet such that each PEU may respectively and independently generate a voting result in order to make a determination whether to take additional action based on the voting result.

At $t_{10}$, the block 530 indicates action may be taken. In one aspect, the block 530 may correspond to the blocks 440, 445 of the method 400. One of skill in the art will appreciate that the critical timeframe 540 may not include the time to perform additional action. At $t_{12}$, the block 535 indicates a logging result may be generated. In one aspect, the block 525 may correspond to the block 450 of the method 400. The timeline terminated at $t_{13}$.

Figure 6:
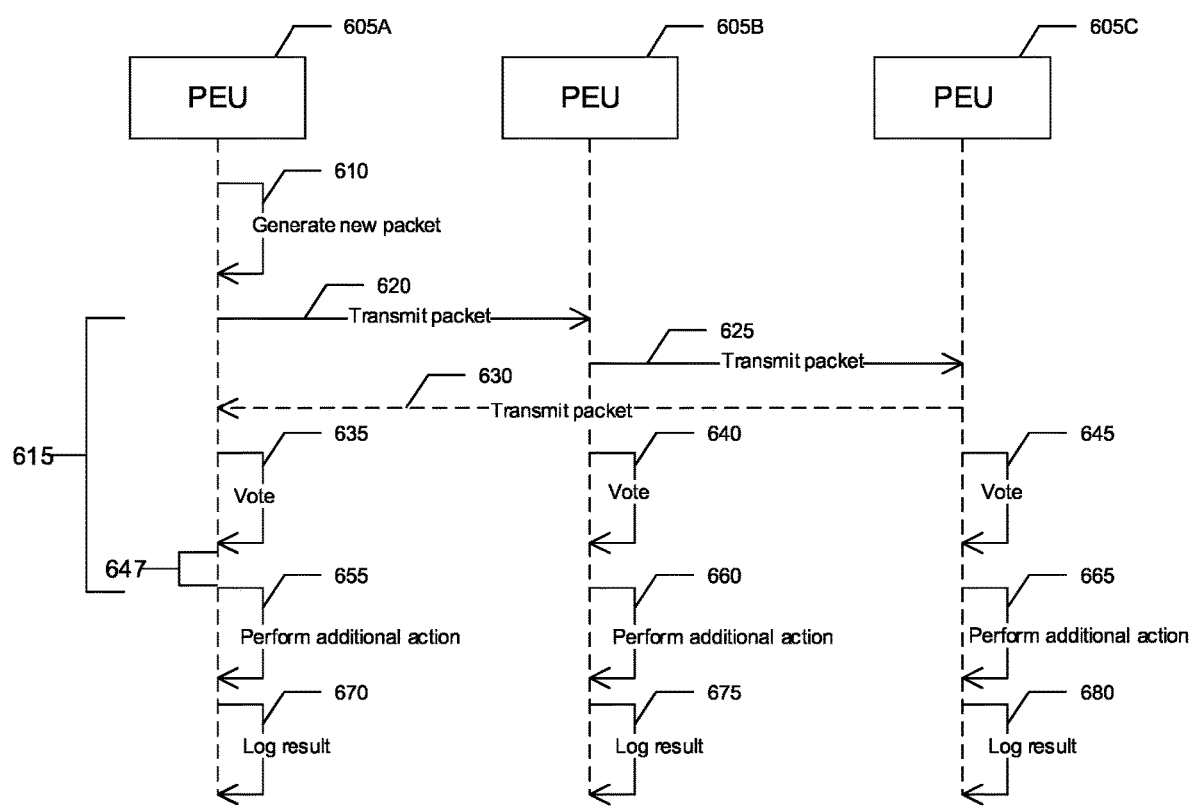
FIG. 6 is a sequence diagram illustrating the operation and timing of events within a communication network.

FIG. 6 is a sequence diagram illustrating the operation and timing of events within a communication network. The communication network may have a PEU 605A, a PEU 605B, a PEU 650C. In one aspect, the PEUs 605A, 605B, 605C may correspond to the PEUs 205A, 205B, 205C. Further, the communication network may correspond to the communication network 250. At arrow 610, the PEU 605A generates a new packet. The arrow 610 may correspond to the blocks 410, 415 of the method 400. A critical timeframe 615 begins when the arrow 620 begins. In one aspect, the critical timeframe 615 may correspond to the critical timeframe 540 above. At the arrow 620, the PEU 605A transmits a network packet to the PEU 605B. At the arrow 625, the PEU 605B may then transmit the same network packet to the PEU 605C. At the arrow 630, the PEU 605C may then transmit the same network packet to the PEU 605A.

One of skill in the art will appreciate the arrows 620, 625, 630 may likewise indicate receipt of the same network packet. In one aspect, the arrows 620, 625, 630 may correspond to the block 430 of the method 400. One of skill in the art will appreciate that PEU 605A both sends and receives the same network packet in the aforementioned aspects.

At the arrow 635, the PEU 605A determines a voting result. In one aspect, the arrow 635 may correspond to the block 435 of the method 400. At arrow 640, the PEU 605B determines a voting result similarly to the PEU 605A at the arrow 635. At the arrow 645, the PEU 605C determines a voting result similarly to the PEU 605A, at the arrow 635, as well. One of skill in the art will appreciate the arrows 635, 640, 645 may not be conducted in perfectly timed synchronization. A safety margin 647 may be defined in order to provide an adequate buffer of time in the event of network lag, computational lag, slow memory operations, etc. After the safety margin 647 has passed, the critical timeframe 615 ends.

At the arrow 655, the PEU 605A may perform additional action. In one aspect, the arrow 655 may correspond to the blocks 440, 445 of the method 400. In addition, at the arrows 660, 665, the PEUs 605B, 605C may perform additional action, respectively. One of skill in the art will appreciate the PEUs 605A, 605B, 605C may remain idle and take no action, depending on the nature of the voting result determined above. At the arrow 670, the PEU 605A may perform logging to capture a result. In one aspect, the arrow 670 may correspond to the block 450 of the method 400. In addition, at the arrows 675, 680, the PEUs 605B, 605C may respectively perform logging to capture a result.

Figure 7:
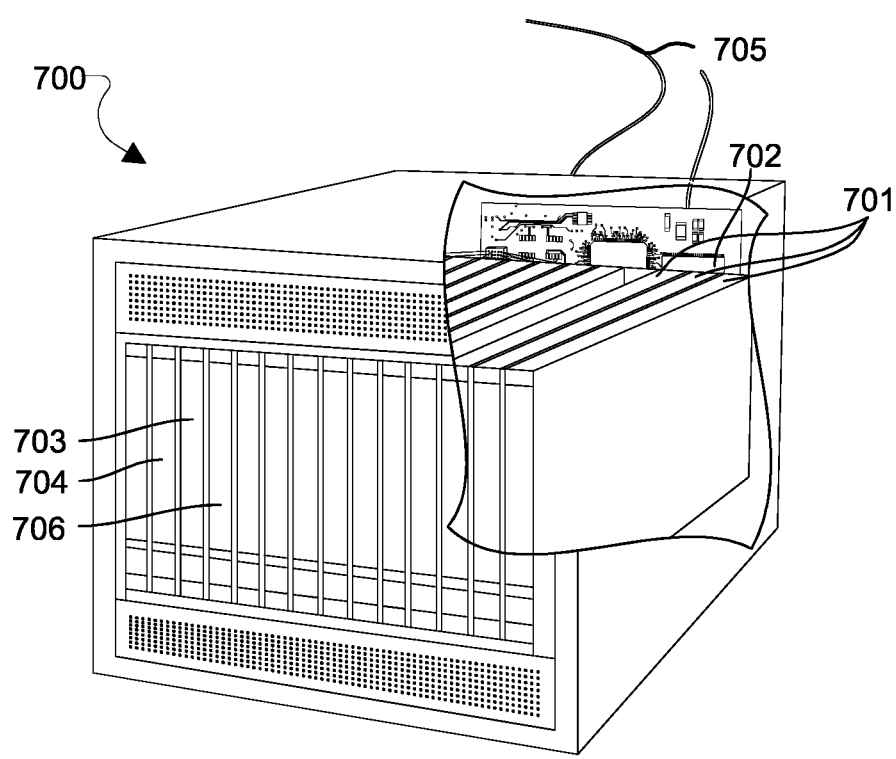
FIG. 7 is a block diagram illustrating an example computer suitable for use with the various aspects described herein.

FIG. 7 is a block diagram illustrating an example computer suitable for use with the various aspects described herein. Such a computer 700 may include one or more processor assemblies 701 (e.g., an x86 processor) coupled to volatile memory 702 (e.g., DRAM) and a large capacity nonvolatile memory 704 (e.g., a magnetic disk drive, a flash disk drive, etc.). As illustrated in FIG. 7, processor assemblies 701 may be added to the computer 700 by inserting them into the racks of the assembly. The computer 700 may also include an optical drive 706 coupled to the processor 701. The computer 700 may also include a network access interface 703 (e.g., an ethernet card, Wi-Fi card, etc.) coupled to the processor assemblies 701 for establishing network interface connections with a network 705. The network 705 may be a local area network, the Internet, the public switched telephone network, and/or a cellular data network (e.g., LTE, 5G, etc.).

One of skill in the art will appreciate that the computer 700 may be operable to carry out the method 400. In one aspect, the method 400 is implemented in software, which may be installed within the volatile memory 702 and/or the nonvolatile memory 704. Likewise, the modules 215, 220, 225, 230, 237, 235, 240, 245 may be embodied within the method 400.

Computer program code (e.g., "code") may be written for execution on a processor to carry out operations of the various aspects described herein. Code may be written in a high-level programming language such as C, C++, C#, Rust, Ruby, Lua, Smalltalk, Java, JavaScript, etc. Code may form programs which are operable to being stored on a computer-readable storage medium. Code as used herein may further refer to machine language code (such as object code) whose format is understandable by a processor. The computer-readable may be non-transitory in one aspect. As used in this description, the terms "component," "module," "system," "engine," and the like are intended to include a computer-related entity, such as, but not limited to, hardware, firmware, a combination of hardware and software, software, or software in execution, all of which may be configured to perform particular operations or functions. For example, a component may be, but is not limited to, a process, a processor, an object, an executable, a thread of execution, a program, and/or a computer. By way of illustration, both an application running on a computing device and the computing device may be referred to as a component. One or more components may reside within a process and/or thread of execution, and a component may be localized on one processor or core and/or distributed between two or more processors or cores. In addition, these components may execute from various non-transitory computer readable media having various instructions and/or data structures stored thereon. Components may communicate by way of local and/or remote processes, function calls, procedure calls, electronic signals, data packets, memory read/writes, and other known network, computer, processor, and/or process related communication methodologies.

A processor may contain multiple resources, processors and/or processing cores integrated on a single or multiple substrate. A processor may contain circuitry for digital, analog, mixed-signal, and radio-frequency functions. A processor may also include any number of general purpose and/or specialized processors (e.g., digital signal processors, modem processors, video processors, etc.), memory blocks (e.g., ROM, RAM, flash, etc.), and resources (e.g., timers, voltage regulators, oscillators, etc.). A processor may also include software for controlling integrated resources and integrated processors, as well as for controlling peripheral devices (e.g., a touchpad, an external component, etc.).

A number of different types of memories and memory technologies are available or contemplated in the future, any or all of which may be included and used in systems and computing devices that implement the various aspects. Such memory technologies/types may include non-volatile random-access memories ("NVRAM") such as Magnetoresistive RAM ("M-RAM"), resistive random access memory ("ReRAM" or "RRAM"), phase-change random-access memory ("PC-RAM", "PRAM" or "PCM"), ferroelectric RAM ("F-RAM"), spin-transfer torque magnetoresistive random-access memory ("STT-MRAM"), and three-dimensional cross point ("3D-XPOINT") memory. Such memory technologies/types may also include non-volatile memory technologies, such as read-only memory ("ROM"), programmable read-only memory ("PROM"), field programmable read-only memory ("FPROM"), one-time programmable non-volatile memory ("OTP NVM"). Such memory technologies/types may further include volatile random-access memory ("RAM") technologies, such as dynamic random-access memory ("DRAM"), double data rate ("DDR") synchronous dynamic random-access memory ("DDR SDRAM"), static random-access memory ("SRAM"), and pseudostatic random-access memory ("PSRAM"). Systems and computing devices that implement the various aspects may also include or use electronic (solid-state) non-volatile computer storage mediums, such as flash memory (e.g., NAND flash). Each of the above-mentioned memory technologies include, for example, elements suitable for storing instructions, programs, control signals, and/or data for use in or by a computer or other digital electronic device. Any references to terminology and/or technical details related to an individual type of memory, interface, standard, or memory technology are for illustrative purposes only, and not intended to limit the scope of the claims to a particular memory system or technology unless specifically recited in the claim language.

The foregoing method descriptions and diagrams/figures are provided merely as illustrative examples and are not intended to require or imply that the operations of various aspects must be performed in the order presented. As will be appreciated by one of skill in the art, the order of operations in the aspects described herein may be performed in any order. Words such as "thereafter," "then," "next," etc. are not intended to limit the order of the operations; such words are used to guide the reader through the description of the methods and systems described herein. Further, any reference to claim elements in the singular, for example, using the articles "a," "an," or "the" is not to be construed as limiting the element to the singular.

Various illustrative logical blocks, modules, components, circuits, and algorithm operations described in connection with the aspects described herein may be implemented as electronic hardware, computer software, or combinations of both. To clearly illustrate this interchangeability of hardware and software, various illustrative components, blocks, modules, circuits, operations, etc. have been described herein generally in terms of their functionality. Whether such functionality is implemented as hardware or software depends upon the particular application and design constraints imposed on the overall system. One of skill in the art may implement the described functionality in varying ways for each particular application, but such implementation decisions should not be interpreted as causing a departure from the scope of the claims.

The hardware used to implement various illustrative logics, logical blocks, modules, components, circuits, etc. described in connection with the aspects described herein may be implemented or performed with a general purpose processor, a digital signal processor ("DSP"), an application specific integrated circuit ("ASIC"), a field programmable gate array ("FPGA") or other programmable logic device, discrete gate logic, transistor logic, discrete hardware components, or any combination thereof designed to perform the functions described herein. A general-purpose processor may be a microprocessor, a controller, a microcontroller, a state machine, etc. A processor may also be implemented as a combination of receiver smart objects, e.g., a combination of a DSP and a microprocessor, a plurality of microprocessors, one or more microprocessors in conjunction with a DSP core, or any other such like configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions (or code) on a non-transitory computer-readable storage medium or a non-transitory processor-readable storage medium. The operations of a method or algorithm disclosed herein may be embodied in a processor-executable software module or as processor-executable instructions, both of which may reside on a non-transitory computer-readable or processor-readable storage medium. Non-transitory computer-readable or processor-readable storage media may be any storage media that may be accessed by a computer or a processor (e.g., RAM, flash, etc.). By way of example but not limitation, such non-transitory computer-readable or processor-readable storage media may include RAM, ROM, EEPROM, NAND FLASH, NOR FLASH, M-RAM, P-RAM, R-RAM, CD-ROM, DVD, magnetic disk storage, magnetic storage smart objects, or any other medium that may be used to store program code in the form of instructions or data structures and that may be accessed by a computer. Disk as used herein may refer to magnetic or non-magnetic storage operable to store instructions or code. Disc refers to any optical disc operable to store instructions or code. Combinations of any of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed aspects is provided to enable any person skilled in the art to make, implement, or use the claims. Various modifications to these aspects will be readily apparent to those skilled in the art, and the generic principles defined herein may be applied to other aspects without departing from the scope of the claims. Thus, the present disclosure is not intended to be limited to the aspects illustrated herein but is to be accorded the widest scope consistent with the claims disclosed herein.

What is claimed is:

1. A method for a plurality of power electronic units to transfer information within a communication network, the method comprising:
    generating, at a first power electronic unit, a network packet, the generating occurring during a first time period;
    transmitting, from the first power electronic unit, the network packet, the transmitting occurring during a second time period;
    receiving, at a second power electronic unit, the network packet, the receiving occurring during a third time period; and
    determining, at the second power electronic unit, a first voting result, the voting result being based on data within the network packet, the determining occurring during a fourth time period.

2. The method of claim 1, further comprising:
    defining the first time period as a period of time prior to the second time period;

defining the second time period as a period of time prior to the third time period;

defining the third time period as a period of time prior to the fourth time period;

defining the fourth time period as a period of time prior to a fifth time period;

defining a safety margin of time occurring during the fifth time period; and defining a critical time period beginning at the start of the second time period and terminating at the end of the fifth time period.

3. The method of claim 1, the method further comprising:
performing, at the second power electronic unit, a first action based on the first voting result, the performing occurring during a sixth time period, the sixth time period being defined as a period of time occurring after the fifth time period.

4. The method of claim 3, the method further comprising:
logging an event, at the first power electronic unit, the event being based at least on the network packet, the first voting result, the first action, or a combination thereof.

5. The method of claim 1, the method further comprising:
determining, at the first power electronic unit, a second voting result, the second voting result being based on data within the network packet, the determining occurring during the fourth time period, the second voting result being substantially similar to the first voting result.

6. The method of claim 1, wherein the communication network is a bus network logically connecting the first power electronic unit to the second power electronic unit.

7. The method of claim 6, the method further comprising:
transmitting, from the second power electronic unit, the network packet via the bus network to the first power electronic unit, the transmitting occurring during the second time period;
receiving, at the first power electronic unit, the network packet transmitted via the bus network, the receiving occurring during the second period.

8. A power electronic unit, comprising:
a memory;
a network interface connected to a communication network; and
a processor configured to:
generate a network packet during a first time period;
transmit the network packet, via the network interface, during a second time period;
receive the network packet, via the network interface, during a third time period;
determine a first voting result based on data within the network packet, during a fourth time period; and
store the first voting result in the memory.

9. The power electronic unit of claim 8, the processor being further configured to:
define the first time period as a period of time prior to the second time period;
define the second time period as a period of time prior to the third time period;
define the third time period as a period of time prior to the fourth time period;
define the fourth time period as a period of time prior to a fifth time period;
define a safety margin of time occurring during the fifth time period; and
define a critical time period beginning at the start of the second time period and terminating at the end of the fifth time period.

10. The power electronic unit of claim 8, the processor being further configured to:
perform a first action based on the first voting result, the performing occurring during a sixth time period, wherein the sixth time period is defined as a period of time occurring after the fifth time period.

11. The power electronic unit of claim 10, the processor being further configured to:
log an event, wherein the event is based at least on the network packet, the first voting result, the first action, or a combination thereof; and
store a log of the event in the memory.

12. The power electronic unit of claim 8, the processor being further configured to:
determine a second voting result based on data within the network packet, wherein the determining occurs during the fourth time period, further wherein the second voting result is substantially similar to the first voting result.

13. The power electronic unit of claim 8, wherein the communication network is a bus network logically connecting the power electronic unit to one or more other power electronic units.

14. A computer-readable medium storing instructions that, when executed by a computer, cause the computer to:
generate a network packet during a first time period;
transmit the network packet, via a network interface coupled to the computer, during a second time period;
receive the network packet, via the network interface, during a third time period;
determine a first voting result based on data within the network packet, during a fourth time period; and
store the first voting result in a memory coupled to the computer.

15. The computer-readable-medium-stored instructions of claim 14 that, when executed by the computer, further cause the computer to:
define the first time period as a period of time prior to the second time period;
define the second time period as a period of time prior to the third time period;
define the third time period as a period of time prior to the fourth time period;
define the fourth time period as a period of time prior to a fifth time period;
define a safety margin of time occurring during the fifth time period; and
define a critical time period beginning at the start of the second time period and terminating at the end of the fifth time period.

16. The computer-readable-medium-stored instructions of claim 14 that, when executed by the computer, further cause the computer to:
perform a first action based on the first voting result, the performing occurring during a sixth time period, wherein the sixth time period is defined as a period of time occurring after the fifth time period.

17. The computer-readable-medium-stored instructions of claim 16 that, when executed by the computer, further cause the computer to:
log an event, wherein the event is based at least on the network packet, the first voting result, the first action, or a combination thereof; and store a log of the event in a memory coupled to the computer.

18. The computer-readable-medium-stored instructions of claim 14 that, when executed by the computer, further cause the computer to:
   determine a second voting result based on data within the network packet, wherein the determining occurs during the fourth time period, further wherein the second voting result is substantially similar to the first voting result.

19. The computer-readable-medium-stored instructions of claim 14, wherein the transmitting and receiving via the network interface is performed via a communication network connected to at least one other computer.

20. The computer-readable-medium-stored instructions of claim 19, wherein the communication network comprises a bus network.

\* \* \* \* \*